United States Patent

[11] 3,563,232

[72] Inventors James Webb
Administrator of the National Aeronautics and Space Administration with respect to an invention of:
Lester N. Wright, Long Beach; Peter R. Barker, Lawndale, Calif.
[21] Appl. No. 720,041
[22] Filed Apr. 10, 1968
[45] Patented Feb. 16, 1971

[54] VIBROPHONOCARDIOGRAPH
3 Claims, 3 Drawing Figs.
[52] U.S. Cl. .................................................. 128/2.05
[51] Int. Cl. .................................................. A61b 5/02
[50] Field of Search ........................................... 128/2.05; 179/1st.; 330/28, 104

[56] References Cited
UNITED STATES PATENTS

| | | | |
|---|---|---|---|
| 3,144,564 | 8/1964 | Sikorra............................ | 330/104X |
| 3,154,066 | 10/1964 | Grindheim et al............. | 128/2.05 |
| 3,176,681 | 4/1965 | Smith............................. | 128/2.05 |
| 3,187,098 | 6/1965 | Farrar et al.................... | 128/2.05X |
| 3,267,386 | 8/1966 | Davis et al..................... | 330/28X |
| 3,283,181 | 11/1966 | Johanson........................ | 128/2.05X |
| 3,405,288 | 10/1968 | Dittrich.......................... | 128/2.05X |

*Primary Examiner*—William E. Kamm
*Attorneys*—D. E. Leslie, J. H. Warden and G. T. McCoy ABSTRACT: Apparatus is disclosed for monitoring cardiac dynamics comprising an extremely low weight and small volume piezoelectric microphone with an amplifier having high input impedance for high sensitivity and low frequency response in a dynamic range of from about 2 to 2,000 cycles per second.

PATENTED FEB 16 1971

3,563,232

INVENTORS
LESTER N. WRIGHT
PETER R. BARKER
BY
D E Leslie
A H McCoy
ATTORNEY 3,563,232

VIBROPHONOCARDIOGRAPH

ORIGIN OF INVENTION

The invention described herein was made in the performance of work under a NASA contract and is subject to the provisions of section 305 of the National Aeronautics and Space Act of 1958, Public Law 85—568 (72 Stat. 435; 42 U.S.C. 2457).

BACKGROUND OF THE INVENTION

1. Field of the Invention

This invention relates to an apparatus for monitoring cardiac dynamics referred to herein after as a vibrophonocardiograph (VPC), and more particularly to such apparatus using an extremely low weight and small volume piezoelectric microphone with an amplifier having high input impedance for high sensitivity and low frequency response in a dynamic range of from about 2 to 2,000 cycles per second.

2. Description of the Prior Art

Various vibrophonocardiographic sensors have been devised in the past using such transducers as capacitive microphones, crystal transducers and crystal microphones. Whereas the capacitive transducer has been found to have a good dynamic range and fidelity for use in a vibrophonocardiograph, such a transducer may be used to advantage only in a laboratory environment because of its weight and size. A crystal transducer has been found to have an acceptable dynamic range but, although it is smaller and therefore more adaptable to monitoring a subject in a dynamic environment than a capacitive transducer, the mass was found to be too large for best results. Crystal microphones suggested by the general disclosure in U.S. Pat. No. 3,030,946 relating to a cardiac diagnostic method would also give acceptable results, but again only with a microphone having relatively large mass and volume. For monitoring cardiac mechanical activity of an active subject who may also be in a dynamic environment, it is important to reduce the mass and volume without sacrificing performance, particularly low frequency response.

OBJECTS AND SUMMARY OF THE INVENTION

A primary object of the present invention is to provide an improved vibrophonocardiograph.

Another object of the invention is to provide a vibrophonocardiographic sensor of low weight and small volume without sacrifice to sensitivity and frequency response in the dynamic range of interest.

Still another object is to provide a vibrophonocardiograph with low voltage therein for safe use on human subjects.

These and other objects are achieved in apparatus for monitoring cardiac dynamics and other cardiovascular activity by the use of a low weight and small volume piezoelectric microphone with an amplifier having high input impedance. A field-effect transistor (FET) in the input stage of the amplifier provides very high input impedance. Even higher impedance is realized through regenerative feedback. For stability, degenerative feedback is also provided.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
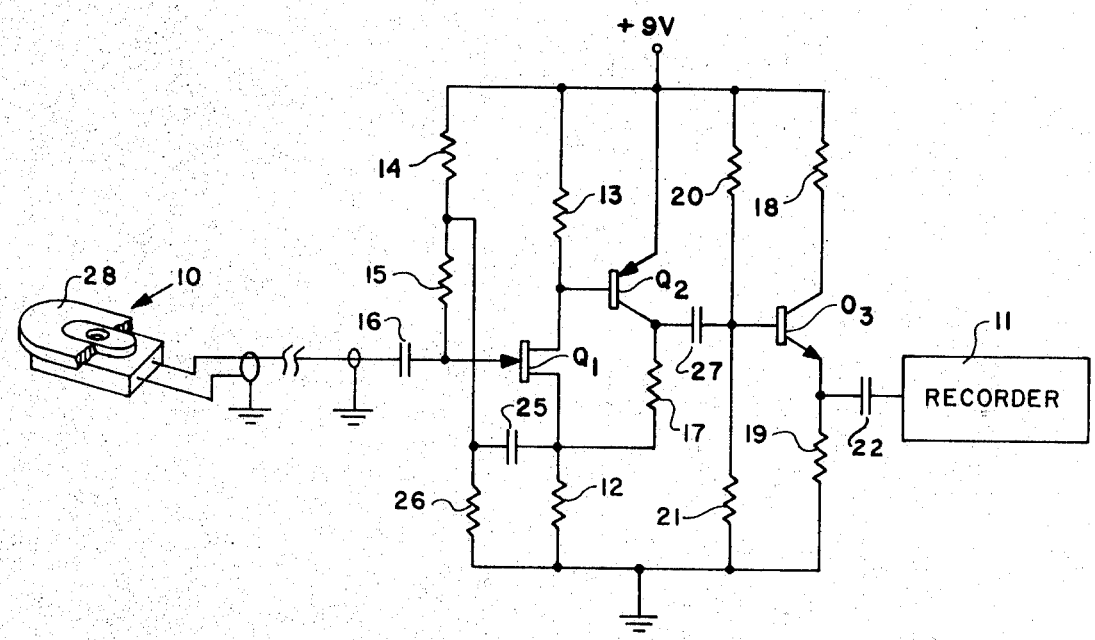
FIG. 1 is a schematic diagram of a preferred embodiment of the invention.

Referring now to FIG. 1, a low mass, small volume piezoelectric microphone 10 is shown coupled to a recorder 11 by an amplifier comprising an N-channel field-effect transistor $Q_1$ for high input impedance, a PNP junction transistor $Q_2$ for voltage amplification and an NPN junction transistor $Q_3$ for coupling into a low input impedance in the recorder 11. The piezoelectric microphone 10 is a type CA5A manufactured by Shure Bros., Inc., of Chicago, Ill. However, other low mass, small volume piezoelectric microphones may be used to equal advantage in accordance with the teachings of the present invention.

The source electrode of transistor $Q_1$ is biased by a resistor 12 connected to ground while the drain electrode is biased by a resistor 13 connected to a source of positive potential (+6 to 9 DC). The gate electrode is then biased by a pair of resistors 14 and 15 connected in series to the source of positive potential. The output signal of the microphone 10 is coupled by a capacitor 16 to the gate electrode of the transistor $Q_1$. A low noise coaxial cable about 2 feet long is employed between the microphone 10 and the capacitor 16 for convenience, but other lengths may be used. The amplified and phase-inverted output of the transistor $Q_1$ is taken from the drain electrode thereof and connected directly to the base electrode of the PNP transistor $Q_2$ which has its emitter connected directly to the source of positive potential, and its collector connected to the ground through a resistor 17 in series with the resistor 12. Accordingly, the transistor $Q_2$ is connected in a common emitter configuration for voltage amplification.

The amplified voltage signal derived from the collector of the transistor $Q_2$ is coupled to the base of the NPN transistor $Q_3$ when has its collector biased by a resistor 18 connected to the source of positive potential, its emitter biased to ground through a resistor 19, and its base biased by voltage-dividing resistors 20 and 21 connected between the source of positive potential and ground.

The output signal of the amplifier is coupled from the emitter of transistor $Q_3$ to the recorder 11 by a capacitor 22. Thus, the transistor $Q_3$ functions as an emitter follower for matching the low input impedance of the recorder 11. If the recorder does not have low input impedance, the configuration of the transistor $Q_3$ may be modified or eliminated.

To increase the input impedance of the first stage, transistor $Q_1$, to about $1,000 \times 10^6$ ohms, regenerative feedback is provided from the collector of the second stage, transistor $Q_2$, through the resistor 17 and a capacitor 25 connected to a junction between resistors 14 and 15. A resistor 26 connected between that junction and ground reduces the feedback signal being applied to the gate of the transistor $Q_1$ to the desired level.

Since the collector of the transistor $Q_2$ is biased through the resistor 17 connected to the source electrode of the transistor $Q_1$, it should be appreciated that feedback current is also being conducted through the resistor 12. However, that feedback current is at a higher AC level than the AC current through the transistor $Q_1$. In that manner, degenerative feedback is also provided to the first stage, transistor $Q_1$ for stability.

Although the primary function of the second stage, transistor $Q_2$, is to provide feedback to the first stage, its secondary function is to provide voltage amplification, but since the piezoelectric microphone 10 provides a signal of sufficient amplitude for the recorder 11 which may be, for example, a magnetic recorder or an oscillographic recorder which is normally provided with a high gain preamplifier, voltage amplification is not important. A coupling capacitor 27 blocks the DC component of the signal transmitted from the second stage, transistor $Q_2$, to the emitter-follower stage, transistor $Q_3$.

In practice, the microphone 10 is bonded to an aluminum mounting plate 28 (shown partially broken away in FIG. 1). The assembly is then placed externally on the chest of a subject over or near the point of maximum impulse created by the heart mechanical activity, using a suitable adhesive between the mounting plate and the subject, or an adhesive in the same manner with an elastic bandage or rubber strap, or with only an elastic bandage or rubber strap. For best results however, both an adhesive (contact cement) and rubber strap or elastic bandage should be used. With that attachment of the low mass, small volume microphone to the subject, and the high input impedance amplifier coupling the microphone to a recorder, a flat frequency response (±1 db) from about 2 cycles per second to about 2,000 cycles per second is achieved. This flat low frequency response with a piezoelectric microphone having a low frequency response down to only about 40 cycles per second with a 160 megohm load is made possible by the higher input impedance (about 1,000 megohms) of the amplifier coupling the output of the piezoelectric microphone 10 to the recorder 11. The mounting plate keeps the transducer properly oriented for maximum sensitivity and minimum noise (response to artifacts).

Figure 2:
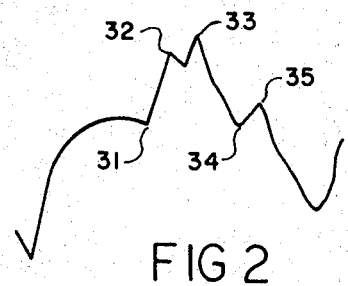
FIG. 2 is a typical recording of a cardiac cycle produced with a vibrophonocardiograph as shown in FIG. 1.

Referring now to FIG. 2, a facsimile of a recording of a cardiac cycle monitored by the apparatus illustrated in FIG. 1 clearly shows certain points of interest such as onset of isovolumetric contraction at point 31, opening of semilunar valves at point 32, rapid ejection between points 32 and 33, reduced ejection between points 33 and 34, and closure of semilunar valves at point 35. For better analysis of the function and condition of the heart, an electrocardiogram may be recorded simultaneously, as may other parameters. Since there is substantially no delay in the production of the vibrophonocardiogram relative to the electrocardiogram, direct comparison and correlation can be made of the recorded signals.

If desired, the vibrophonocardiographic signal may be filtered to provide only a record of the frequency range of interest, for instance 3 to 20 cycles per second. If so, a slight delay in producing the record of the filtered vibrophonocardiographic signal may be introduced as described in a paper on the research which led to the present invention titled "Flight Research Program — V111. Study of Vibrophonocardiographic (VPC) Techniques for Monitoring Cardiac Dynamics in the Flight Environment" published by the inventors in cooperation with J. T. Celentano, M.D. and D. M. Walton in Aerospace Medicine, vol. 38, No. 6 (June, 1967) at pages 569 to 576.

Figure 3:
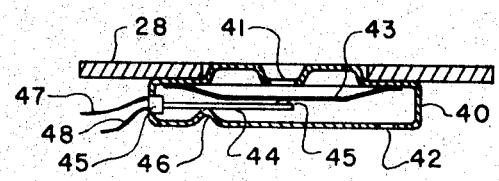
FIG. 3 is a longitudinal section of a piezoelectric microphone in the preferred embodiment on FIG. 1.

The microphone 10 illustrated in a longitudinal section in FIG. 3 consists of a metal enclosure 40 about 1 inch long, a quarter of an inch wide and a tenth of an inch thick, It has a front opening 41 and a back vent 42. The front of the enclosure 40 has a portion surrounding the opening 41 raised sufficiently to allow the mounting plate 28 to be bonded to the face of the microphone. A plate 0.0156 inches thick permits a flush mounting such that when the mounting plate is attached to the subject, the sensitive face of the microphone enclosure 40 surrounding the opening 41 will be against the subject.

A flexible diaphragm 43 is attached inside the front face of the enclosure and to a free end of an elongated piezoelectric element 44, as by a drop 45 of epoxy resin. The base of the element 44 is firmly attached to a dielectric block 45 cemented to the enclosure 40. Thus, both ends of the element 44 are electrically isolated so that as it is subjected to stress and strain in response to motion of the diagram, an electrostatic voltage is developed across it in a manner known to those skilled in the art. The vent 42 allows free motion of the diagram (i.e., prevents the pressure in back of the diaphragm from increasing as the diaphragm moves toward the back). To enhance the stress and strain in response to a given displacement of the diaphragm 43, a depressed portion 46 is provided on the back of the enclosure 40. The element is suitable coated with dielectric material to prevent shorting the electrostatic voltage developed therein at the point of contact (depressed portion 46) with the enclosure 40. Leads 47 and 48 are connected to the element 44 through the dielectric block 45. The piezoelectric element 44 is preferable a lead-zerconate-titanate ceramic bar and the total weight of the microphone is less than 1.8 grams. However, it should be understood that any piezoelectric element in a suitable enclosure may be employed. This particular, commercially available, piezoelectric microphone is here described in some detail only to provide a more complete understanding of the embodiment illustrated in FIG. 1 actually reduced to practice with components of the following types and values:

| | |
|---|---|
| Resistor 12 | 1K |
| Resistor 13 | 2K |
| Resistor 14 | 560K |
| Resistor 15 | 5M |
| Resistor 17 | 1K |
| Resistor 18 | 100 |
| Resistor 19 | 16K |
| Resistor 20 | 130K |
| Resistor 21 | 220K |
| Resistor 26 | 51K |
| Capacitor 16 | 2.2mf. |
| Capacitor 22 | 100mf. |
| Capacitor 25 | 100mf. |
| Capacitor 27 | 5mf. |
| Transistor $Q_1$ | FE 202 |
| Transistor $Q_2$ | 2N 1132 |
| Transistor $Q_3$ | 2N 697 |

It should of course, be appreciated that many modifications may be made without departing from the true spirit of the invention. For instance, an insulated gate, field-effect transistors (commonly referred to as the MOS type) may be found to have a sufficiently high input impedance for the piezoelectric microphone selected. If not, feedback may be employed to increase its input impedance, in addition, any other utilization means may be employed instead of a recorder, such as a computer in the event on-line analysis of the cardiac dynamics is desired.

The piezoelectric microphone illustrated in FIG. 3 is sufficiently inexpensive to warrant disposing of it after use in a contaminated environment, and the entire apparatus is sufficiently inexpensive to be considered disposable. It is also suitable for use in extreme environments, such as in flight at altitudes as high as, say, 40,000 feet.

Although particular embodiments of the invention have been described and illustrated herein, it is recognized that modifications and variations may readily occur to those skilled in the art and consequently it is intended that the claims be interpreted to cover such modifications and equivalents.

We claim:
1. Apparatus for monitoring cardiac dynamics of a subject comprising:
a piezoelectric microphone of a total weight of the order of 1.8 grams having an enclosure of a total volume of the order 25×10⁻³ cubic inches with an opening in one face for receiving acoustic energy in the form of air pressure waves and adapted to be placed externally on the chest of said subject with said opening against said subject, said microphone having:
a piezoelectric element inside of said enclosure and away from any contact with said subject through said opening, said element having one end secured to said enclo- sure and another end free to move relative to said enclosure;

a flexible diaphragm attached inside said enclosure to separate said element from said opening;

means attaching an area of said diaphragm directly over said hole to said free end of said element; and an output terminal connected to said element to obtain piezoelectric signals in response to air pressure waves against said diaphragm;

utilization means having an input terminal adapted to receive signals which vary as a function of said subject's cardiac activity; and an amplifier having an input stage with a very high input impedance of the order of 1,000 megohms coupling said output terminal of said piezoelectric microphone to said input terminal of said utilization means.

2. Apparatus as defined in claim 1 including means for maintaining said piezoelectric microphone stable on said subject in a position oriented for maximum response to cardiac activity.

3. Apparatus as defined in claim 2 wherein said microphone enclosure has a raised portion around said opening, and said means for maintaining said piezoelectric microphone stable on said subject comprises a mounting plate surrounding said raised portion, said plate being bonded to said microphone in a position substantially flush with the top of said raised portion, whereby a maximum of energy produced by cardiac activity is coupled into said piezoelectric microphone through said opening when said plate is secured against said subject.